United States Patent [19]
Gropp, Sr.

[11] 4,012,062
[45] Mar. 15, 1977

[54] SANDING DEVICE FOR A MOTOR VEHICLE
[75] Inventor: Joseph A. Gropp, Sr., Coral Spring, Fla.
[73] Assignee: Lawrence Peska Associates, Inc., New York, N.Y. ; a part interest
[22] Filed: Oct. 16, 1975
[21] Appl. No.: 623,265
[52] U.S. Cl. .................................. 291/25; 291/38
[51] Int. Cl.$^2$ ........................................ B60B 39/06
[58] Field of Search ................... 291/25, 38, 39, 1; 222/485

[56] References Cited
UNITED STATES PATENTS

| | | | |
|---|---|---|---|
| 1,066,698 | 7/1913 | Barcafer | 291/39 |
| 1,657,960 | 1/1928 | Ficarra | 291/38 |
| 1,833,084 | 11/1931 | Liedberg | 291/38 |
| 3,271,061 | 9/1966 | Miller | 291/38 |

*Primary Examiner*—Trygve M. Blix
*Assistant Examiner*—Reinhard J. Eisenzopf

[57] ABSTRACT

A sanding device is mounted in a motor vehicle for depositing a non-skid substance at a controlled rate just forwardly of each rear wheel of the motor vehicle. The device includes a tank having a pair of chutes associated therewith, wherein the chutes extend downwardly to a point just forwardly of each rear wheel. Each chute has an open lower end for permitting discharge of the sand. A slide valve is affixed to each lower end of each chute. A cable assembly communicates between the slide valves and a lever arm contained in the interior of the motor vehicle.

1 Claim, 6 Drawing Figures

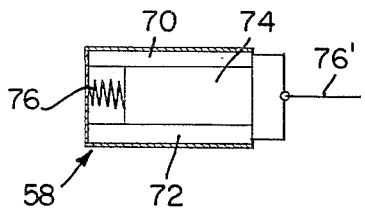
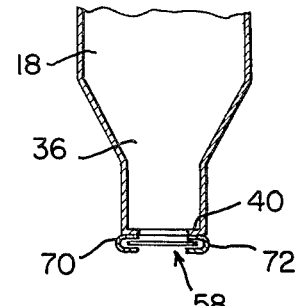
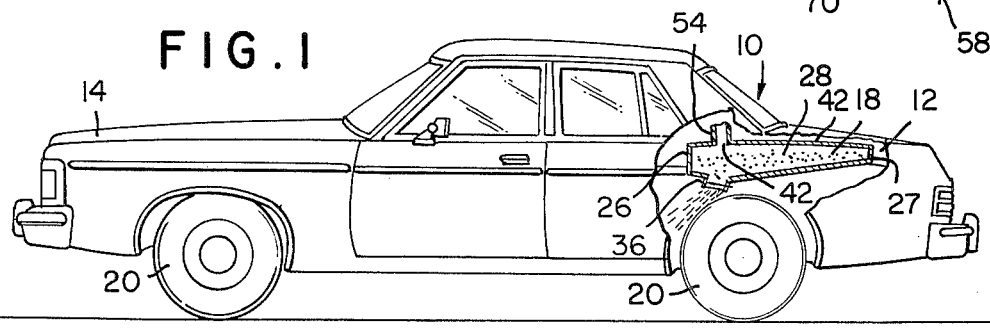
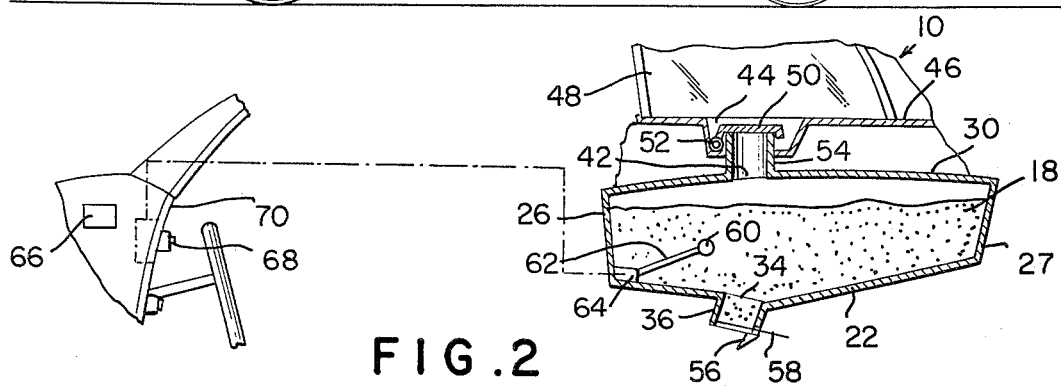
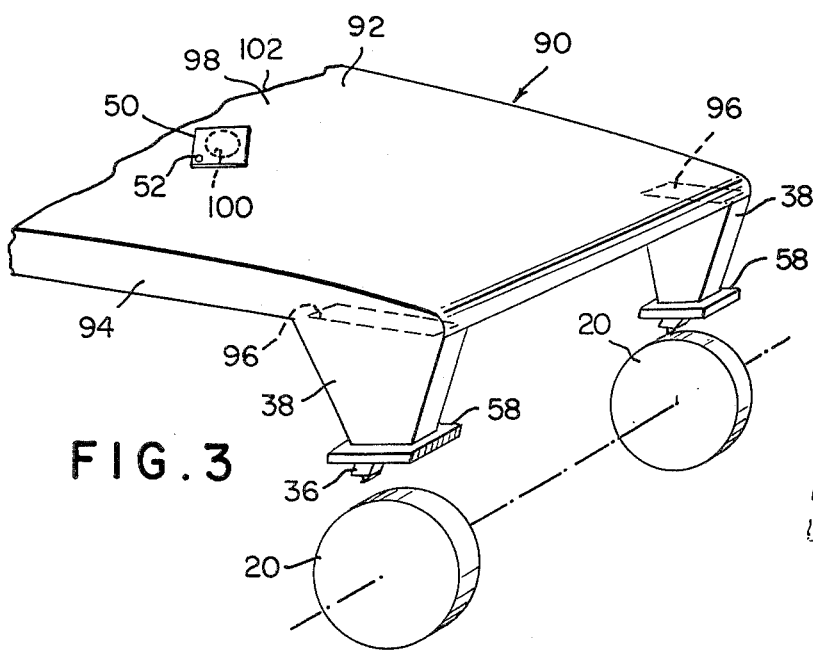
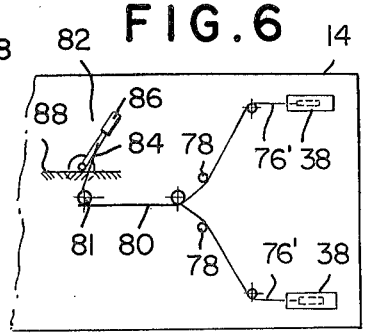

SANDING DEVICE FOR A MOTOR VEHICLE

BACKGROUND OF THE INVENTION

U.S. Pat. No. 1,973,083 to Levorchick et al. teaches a sanding device having a tank, a chute and a cable assembly. The valve assembly on each chute is complicated in design. This patent fails to teach a means for filling the tank from the outside of vehicle. This patent also fails to teach a tank contained in the trunk or the roof of the vehicle.

U.S. Pat. No. 2,307,798 to Kook et al. teaches a receptacle for holding the sand in an engine compartment of the vehicle. This patent employs a butterfly valve of unnecessarily complicated design, wherein the valve is disposed at the juncture of the receptacle and the chutes.

U.S. Pat. No. 3,032,361 to Jones teaches a container for holding the sand, wherein the container is detachably mounted externally to the motor vehicle, A vacuum means is employed for discharging the sand from the container.

These aforementioned patents are non-applicable to my present invention, wherein a means for controlling the rate of flow of the sand is provided.

SUMMARY OF THE INVENTION

My present invention relates to a unique and novel sanding device for a motor vehicle.

An object of my present invention is to provide a sanding device for a motor vehicle, wherein sand is delivered at a control rate to a point just forwardly of each rear wheel.

A still further object of my present invention is to provide a sanding device readily adaptable to already existing motor vehicles.

A still further object of my present invention is to provide a means of filling the tank of the sanding device from the outside of the motor vehicle.

Another object of my present invention is to provide a tank for the sanding device as an integral part of the roof of the motor vehicle whereby the tank filled with sand imparts stability to the motor vehicle.

Another object of my present invention is to provide a slide valve for controlling the rate of flow of sand.

Briefly, my present invention comprises a sanding device mounted in a motor vehicle for depositing a non-skid substance at a controlled rate just forwardly of each rear wheel of the motor vehicle. The device includes a tank having a pair of chutes associated therewith, wherein the chutes extend downward to a point just forwardly of each rear wheel. Each chute has an open lower end for permitting discharge of the sand. A slide valve is affixed to each lower end of each chute. A cable assembly communicates between the slide valves and a lever arm contained in the interior of the motor vehicle.

BRIEF DESCRIPTION OF THE DRAWINGS

The objects and features of the invention may be understood with reference to the following detailed description of an illustrative embodiment of the invention, taken together with the accompanying drawings in which:

FIG. 1 illustrates a side partially cutaway view of a motor vehicle having a sanding device with the tank positioned in a trunk of the motor vehicle;

FIG. 2 illustrates a side cross sectional view of the tank of the sanding device mounted in the motor vehicle;

FIG. 3 illustrates a perspective view of a second embodiment of the sanding device, wherein the tank is formed in a roof of the motor vehicle;

FIG. 4 illustrates a bottom view of a slide valve affixed to a lower end of a chute of the sanding device;

FIG. 5 illustrates an end view of the slide valve; and

FIG. 6 illustrates a side view of the cable assembly which controls the slide valve.

DESCRIPTION OF THE PREFERRED EMBODIMENT

Turning now descriptively to the drawings, in which similar reference characters denote similar elements throughout the several views, FIGS. 1–2 show a first embodiment of a sanding device 10 adapted to be received in a trunk 12 of a motor vehicle 14, wherein sand 16 or salt is adapted to be received into the tank 18 and delivered at a uniform controlled rate to a point just forwardly of the rear wheels 20 of the motor vehicle 10. The tank device 10 comprises the tank 18 having a base 22, four upwardly extending side walls 24, 26, 28, 30, and a top 32 of a convex curvative. The base 22 is of a V-shaped configuration thereby allowing the sand 16 in the tank to flow uniformly by gravitational force to the bottom center 34 of the base 22. At each end of the base 22 disposed along the bottom center 34 is an opening 36 therethrough. Frusto conical shaped chutes 38 are affixed onto the base 22 at each opening 36, wherein each chute 38 is adapted to extend downwardly through the base of the motor vehicle to a point just forwardly of each rear wheel 20 of the motor vehicle 14. The lower end 40 of each chute 38 is open and of a generally rectangular shape. The top 32 of the tank 18 has a hole 42 therethrough. The body of the motor vehicle 14 has an aperture 44 therethrough, wherein aperture 44 is disposed between the trunk cover 46 and a rear window 48 of the motor vehicle 14. A lid cover 50 having a spring assembly 52 associated therewith is positioned in aperture 44. A chute assembly 54 communicates between the hole 42 and aperture 44, thereby allowing the tank 18 to be filled with the sand 16 through the chute assembly 54. A deflector shield 56 is affixed to the lower end 40 of each chute 38 thereby permitting directional control of the flow of the sand 16 from each chute 38. A slide valve 58 is slidably affixed to the lower end 40 of each chute 38 thereby controlling the rate of flow of sand 16 from each chute 38. A float ball 60 lighter than the sand 16 is contained in the tank 16 and affixed to an elongated pivot arm 62. The other end of the pivot arm 62 is affixed to a micro switch 64. The micro switch 64 is wired in series to the battery 66 of the motor vehicle 14 and to a light means 68 adapted to be mounted in the dashboard 70 of the motor vehicle 14. When the sand 16 is emptied from the tank 18, the downward movement of the float ball 60 causes activation of the micro switch 64 at a predetermined height of the ball 60 within the tank 18.

FIGS. 4–6 show a more detailed view of each slide valve 58. Each valve 58 comprises a pair of U-shaped channel flanges 70, 72 affixed to parallel sides of each lower end 40 of each chute 38. A slide plate 74 is slidably contained in each pair of flanges 70, 72, wherein the plate 74 covers the open lower end 40 thereby restricting the flow of sand 16 through each chute 38. A spring 76 communicates between one end of each plate 74 and a third side of the lower end 40 of each chute 38 thereby keeping the plate 74 in a normally closed position over the opened lower end 40 of each chute 38. A pair of joining cable members 76 are joined to the other ends of plates 74, wherein each cable 76 passes through a first guide pulley 78 affixed onto the underside of the motor vehicle 14. The free ends of the cables 76 are joined to a cable member 80 which extends forwardly under the motor vehicle 14, passes through a second guide pulley 81 affixed to the underside of the motor vehicle 14, and extends upwardly into the interior compartment 82 of the motor vehicle 14 just rearwardly of the dashboard 70. The forward free end 84 of cable member 80 is joined to a shift lever 86 pivotally mounted in the floor board 88 of the motor vehicle 14. When the shift lever 86 is pushed forwardly, tension is placed on cables member 80 and cables 76, thereby causing plates 74 to slide within flanges 70, 72. As the lever 86 is pushed further forwardly, the plates 74 move farther thereby causing an increase rate of flow of sand 16 from each chute 38.

FIG. 3 shows a second embodiment of the device 10, wherein the tank 18 is formed in the roof 90 of the motor vehicle 14. The roof 90 of the vehicle 14 has a hollow chamber 92 therein, wherein each rear corner of the base 94 of the roof 90 has a rectangularly shaped opening 96 therethrough. Chutes 38 of the same general configuration as described in the first embodiment extend downwardly from each corner of the base 94 at the aperture 96 to a point just forwardly of the rear wheels 20. The valve 58 at the lower end of each chute 38 is identical to that described in the first embodiment. The top 98 has a rectangular shaped hole 100, wherein hole communicates with chamber 92 thereby permitting sand 16 to be injected into chamber 92 through hole 100. An identical lid cover 50 with spring assembly 52 is contained in hole 100. The base 94 of the roof 90 is slanted downwardly from the forward edge 102 to the rear edge 104 of the roof 90 thereby permitting sand 16 to flow by gravitational force to chutes 38.

Since obvious changes may be made in the specific embodiment of the invention described herein, such modifications being within the spirit and scope of the invention claimed, it is indicated that all matter contained herein is intended as an illustrative and not as limiting in scope.

Having thus described the invention, what I claim as new and desire to secure by Letters Patent of the United States is:

1. A sanding device for a motor vehicle adapted for depositing a non-skid substance at a controlled rate forwardly of each rear wheel, which comprises:
   a. a roof of said motor vehicle having an interior chamber therein adapted to receive said non-skid substance therein;
   b. a pair of chutes communicating in fluid serial connection with said chamber, each said chute extending downwardly to a point forwardly of each said rear wheel, each said chute having a lower open opening;
   c. a deflector shield affixed to said open lower end of each said chute;
   d. a pair of U-shaped channel flanges affixed to said lower end of each said chute;
   e. a pair of slide plates, one of said slide plates slidably disposed in each said pair of U-shaped flanges for opening and closing each said lower end of each said chute;
   f. a pair of springs, one of each said springs communicating between each said plate and each said chute for normally keeping each said chute closed;
   g. a shift lever adapted to be pivotally mounted on an interior floor of said motor vehicle;
   h. a Y-shaped cable assembly, a stem of said cable assembly affixed to said shift lever, a free end of each arm of said cable assembly affixed to one of said plates;
   i. means for injecting said non-skid material into said chamber through said roof of said motor vehicle;
   j. a float ball disposed in said chamber, said ball lighter than said non-skid material disposed in said chamber;
   k. one end of a pivot arm affixed to said float valve;
   l. a microswitch adapted to be mounted on said motor vehicle, said microswitch affixed to another end of said pivot arm; and
   m. a light means adapted to be mounted in a dashboard of said motor vehicle, said light means wired in series to said microswitch and a battery of said motor vehicle.

* * * * *